United States Patent
Ahlawat

(10) Patent No.: US 10,108,849 B2
(45) Date of Patent: Oct. 23, 2018

(54) BIOMETRIC FACIAL RECOGNITION FOR ACCESSING DEVICE AND AUTHORIZING EVENT PROCESSING

(71) Applicant: Bank of America Corporation, Charlotte, NC (US)

(72) Inventor: Samit Ahlawat, Seaford, NY (US)

(73) Assignee: Bank of America Corporation, Charlotte, NC (US)

( * ) Notice: Subject to any disclaimer, the term of this patent is extended or adjusted under 35 U.S.C. 154(b) by 57 days.

(21) Appl. No.: 15/293,835

(22) Filed: Oct. 14, 2016

(65) Prior Publication Data

US 2018/0107865 A1    Apr. 19, 2018

(51) Int. Cl.
  *G06K 9/00* (2006.01)
  *G06F 17/30* (2006.01)
  *H04L 29/06* (2006.01)

(52) U.S. Cl.
  CPC ... *G06K 9/00288* (2013.01); *G06F 17/30256* (2013.01); *G06F 17/30867* (2013.01); *G06K 9/00228* (2013.01); *H04L 63/0861* (2013.01)

(58) Field of Classification Search
  CPC ............. H04L 63/086; G06F 17/30256; G06F 17/30867
  See application file for complete search history.

(56) References Cited

U.S. PATENT DOCUMENTS

| 7,257,836 B1 * | 8/2007 | Moore .................... G06F 21/33 713/166 |
| 7,305,562 B1 | 12/2007 | Bianco et al. |
| 7,522,750 B2 | 4/2009 | Chiang et al. |
| 7,921,297 B2 | 4/2011 | Ortiz et al. |
| 8,132,226 B1 | 3/2012 | Bianco et al. |
| 8,707,388 B1 | 4/2014 | Bianco et al. |
| 8,799,167 B2 | 8/2014 | Carper |
| 8,949,461 B2 | 2/2015 | Steele et al. |
| 9,152,960 B2 | 10/2015 | Chetal et al. |

(Continued)

OTHER PUBLICATIONS

Lin et al., Face Recognition/Detection by Probabilistic Decision-Based Neural Network, Jan. 1997, IEEE Transactions on Neural Networks, vol. 8, No. 1, pp. 114-132.*

(Continued)

*Primary Examiner* — Qian Yang
(74) *Attorney, Agent, or Firm* — Banner & Witcoff, Ltd.; Michael A. Springs

(57) ABSTRACT

Systems and arrangements for performing biometric facial recognition in order to provide access to a device and/or process one or more events are provided. In some examples, one or more images of a user may be received by an entity and pre-processed to obtain a mean pixel value and variance of each image. These values may be stored in association with the image and/or identifying information associated with the user. Upon receiving a request to access a device, the device may capture an image of the user requesting access. The captured image may be processed similarly to the pre-stored images to determine a mean pixel value and variance. The system may compare the determined mean pixel value and variance for the pre-stored images to the captured image to obtain a similarity score. If the similarity score is at or above a predetermined threshold value, the images may be considered a match.

25 Claims, 9 Drawing Sheets

(56) References Cited

U.S. PATENT DOCUMENTS

| | | |
|---|---|---|
| 9,177,130 B2 | 11/2015 | Nechyba et al. |
| 9,398,013 B2 | 7/2016 | Bianco et al. |
| 2013/0246264 A1 | 9/2013 | Lucas et al. |
| 2015/0109428 A1 | 4/2015 | Mechaley, Jr. |
| 2015/0161434 A1* | 6/2015 | Ross .................. G06K 9/00288 382/118 |
| 2016/0191507 A1* | 6/2016 | Bao ..................... H04L 63/0853 455/411 |
| 2016/0379042 A1* | 12/2016 | Bourlai .............. G06K 9/00288 382/118 |

OTHER PUBLICATIONS

Yasuyuki et al., "A Probabilistic Intensity Similarity Measure based on Noise Distributions", 2007, IEEE 1-4244-1180-7/07.*

Viola, Paul and Jones, Michael "Rapid Object Detection using a Boosted Cascade of Simple Features", Accepted Conference on Computer Vision and Pattern Recognition, 2001.

Turk, Matthew A. and Pentland, Alex P. "Face Recognition Using Eigenfaces", IEEE Computer Society Conference on Computer Vision and Pattern Recognition, 1991.

Yang, et al. "Two-Dimensional PCA: A New Approach to Appearance-Based Face Representation and Recognition", IEEE Transactions on Pattern Analysis and Machine Intelligence, vol. 26, No. 1, Jan. 2004.

Zhang, et al. "Two-stage image denoising by principal component analysis with local pixel grouping", Pattern Recognition, vol. 43, Issue 4, Apr. 2010, pp. 1531-1549.

\* cited by examiner

BIOMETRIC FACIAL RECOGNITION FOR ACCESSING DEVICE AND AUTHORIZING EVENT PROCESSING

BACKGROUND

Aspects of the disclosure relate to computer hardware and software. In particular, one or more aspects of the disclosure generally relate to computer hardware and software for conduction biometric facial recognition of a user based on a comparison of a captured image to a pre-stored image.

Maintaining security of information and identities is an important aspect in many industries. In particular, industries that conduct one or more transactions at, for instance, self-service devices or kiosks are particularly keen on ensuring that a user matches the credentials or identity being used to process an event. However, when events are processed at devices that are unmanned, it may be difficult to confirm an identity of a user prior to providing access to the device or conducting the transaction.

Further, while conventional processes, such as using principal component analysis, may be used to perform facial recognition of a user, these conventional processes can take a substantial amount of time and may require substantial computing resources for storing images, outputs of calculations, and the like. Accordingly, it would be advantageous to provide a fast and efficient process for performing facial recognition in order to facilitate providing access to a device and/or processing one or more events at a device.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure relate to computer systems and arrangements for performing biometric facial recognition in order to authenticate a user and provide access to a device, such as a self-service device, and/or process one or more events. In some examples, one or more images of a user may be received by an entity. The entity may pre-process the one or more images to obtain a mean pixel value and pixel variance of each image. In some examples, a simplified covariance matrix may be used to determine these values. These values may then be stored in association with the image and/or identifying information associated with the user (e.g., name, username and password, personal identification number (PIN), or the like).

Upon receiving a request to access a device, such as a self-service device, the device may capture an image of the user requesting access. The captured image may be processed using processes similar to those performed on the pre-stored images to determine a mean pixel value and pixel variance. The system may then compare the images using the determined mean pixel value and pixel variance for the pre-stored images to the captured image to obtain a similarity score. If the similarity score is at or above a predetermined threshold value, the images may be considered a match and the system may enable functionality of the device, permit access to the device, or the like.

If the similarity score is below the threshold, the system may direct or command the device to deny access to the user, provide limited functionality to the user, request additional authenticating information from the user, and the like.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1:
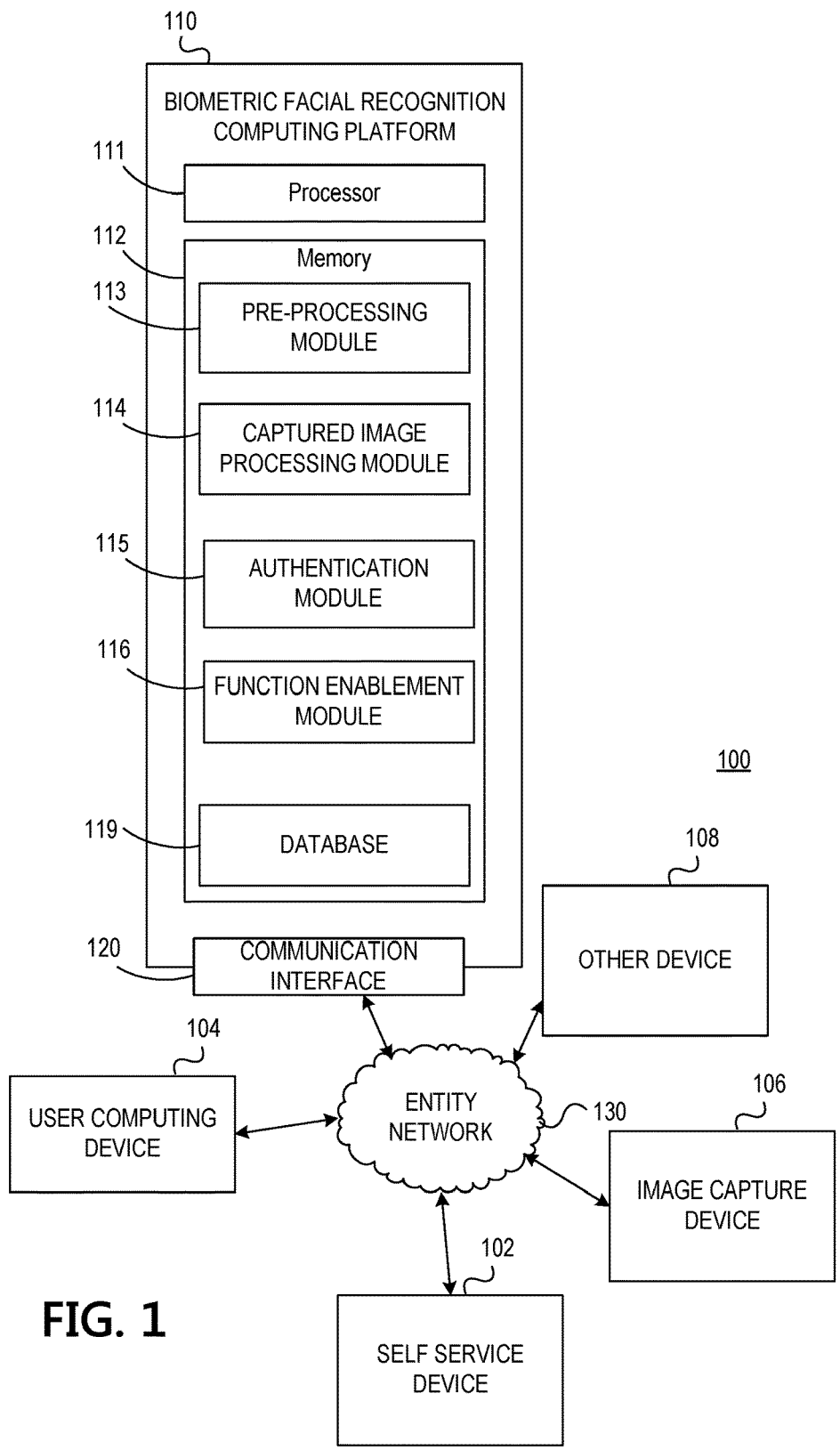
FIG. 1 depicts an illustrative biometric facial recognition computing platform according to one or more aspects described herein.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As discussed herein, maintaining security of information and preventing unauthorized access to information, funds, and the like, is of utmost importance to many entities operating in many different industries. As technology advances and more industries offer self-service devices to provide one or more services, products, or the like, ensuring or validating an identity of a user requesting access to a device or requesting processing of an event can become more difficult. That is, without an operator or representative of the entity present to confirm an identity of a user, conventional methods of authenticating a user can be difficult and, at times, unreliable.

In some examples, facial recognition may be used to authenticate a user. However, conventional methods of performing facial recognition can be time consuming and require substantial computing resources to evaluate the face or image being analyzed and/or to store the results of the analysis. Accordingly, this makes conventional processes for performing facial recognition unsuitable for real-time authentication scenarios such as a self-service device (e.g., an automated teller machine (ATM)).

Accordingly, the arrangements discussed herein are directed to systems and arrangements for performing biometric facial recognition quickly, accurately, and while minimizing the computing and storage resources used. For example, the arrangements described herein employ a probabilistic neural network (PNN) to identify a similarity score of a captured image with one or more pre-stored images associated with a user. In some examples, a diagonal covariance matrix including variance terms is used in a Gaussian kernel of a PNN. This covariance matrix may be built using nine-observation data per pixel and may represent improvements in efficiency and speed of the processing.

In some examples, variance for a pixel is determined using its data and data of eight adjacent pixels. The PNN output may describe a distance between the captured image and one or more pre-stored images to authenticate a user. In some examples, the processes and arrangements described herein may transform the covariance matrix calculation by only including diagonal terms. The modified covariance matrix in PNN may be used to derive a simplified expression of the PNN that quantifies the degree of similarity between captured images and one or more pre-stored images.

These and various other arrangements will be discussed more fully herein.

FIG. 1 depicts an environment 100 including an illustrative computing platform for performing biometric facial recognition according to one or more aspects described herein. For instance, the environment 100 includes a biometric facial recognition computing platform 110, which may include one or more processors 111, memory 112, and communication interface 120. A data bus may interconnect processor(s) 111, memory 112, and communication interface 120. Communication interface 120 may be a network interface configured to support communication between biometric facial recognition computing platform 110 and one or more networks (e.g., network 130). One or more computing or other devices 102, 104, 106, 108, may be in communication with the biometric facial recognition computing platform 110 (e.g., via network 130). Memory 112 may include one or more program modules including hardware and/or software and having instructions that when executed by processor(s) 111 cause the biometric facial recognition computing platform 110 to perform one or more functions described herein, and/or one or more databases 119 that may store and/or otherwise maintain information which may be used by such program modules and/or processor(s) 111. In some instances, the one or more program modules and/or databases may be stored by and/or maintained in different memory units of biometric facial recognition computing platform 110 and/or by different computer systems or devices that may form and/or otherwise make up the biometric facial recognition computing platform 110. In some arrangements, different features or processes performed may be performed by different sets of instructions, such that the processor may execute each desired set of instructions to perform different functions described herein.

Further, in some examples, the biometric facial recognition computing platform 110 may include one or more computing devices or be part of one or more other computing devices, such as computing device 102, 104, 106, 108, or the like. That is, the biometric facial recognition computing platform 110 may be a device separate from computing devices 102, 104, 106, 108, and the like, and connected to or in communication with one or more of those devices, or the biometric facial recognition computing platform 110 may be part of a same device as one or more of devices 102, 104, 106, 108, or the like.

Memory 112 may include a pre-processing module 113. The pre-processing module 113 may include hardware and/or software configured to perform various functions within the biometric facial recognition computing platform 110. For instance, the pre-processing module 113 may receive one or more images of various users. For instance, an entity, such as a financial institution, may capture one or more images of a user when, for example, a user opens an account, becomes a customer, or the like. The one or more images may be used to confirm an identity of a user prior to performing various transactions, such as processing one or more events (e.g., withdrawal, deposit, opening a new account, obtaining a loan, or the like).

The pre-processing module 113 may then perform one or more pre-processing steps on the one or more images of the user. For instance, the pre-processing module may determine a simplified diagonal covariance matrix for each image of the one or more images of the user. In some examples, the pre-processing module may determine whether the image is in grayscale and, if not, may convert the image to grayscale prior to determining the simplified diagonal covariance matrix for the image. In some examples, the covariance matrix may be built using nine-observation data per pixel, which may provide for fast, efficient processing, as will be discussed more fully herein.

The pre-processing module may determine a mean pixel value for each image. For instance, the mean pixel value for each image may be obtained using equation 1.

$$\mu = \sum_{l=1}^{m} \sum_{j=1}^{n} \frac{g[l, j]}{mXn} \quad \text{Equation 1}$$

Where:
$\mu$ is the mean pixel value;
mXn denotes the number of pixels in the image;
l,j is the pixel being evaluated; and
g is the grayscale pixel value at coordinate (l,j).

The variance for a pixel may be determined using its data and data for eight adjacent pixels. For instance, the variance of a pixel (in this example, pixel p[l,j]) may be calculated using equation 2.

$$\text{var}_{l,j} = \sigma_{l,j}^2 = \frac{1}{9} \sum_{a=l-1}^{l+1} \sum_{b=j-1}^{j+1} (g[a, b] - \mu)^2 \quad \text{Equation 2}$$

$$\sum = \text{diag}(\text{var}_{1,1}, \ldots, \text{var}_{mXn,mXn})$$

Where:
a is an index running from (l−1) to (l+1), (i.e., it takes values {l−1, l+1};
b is an index running from (j−1) to (j+1), (i.e., it takes values {j−1, j+1};
$\sigma_{l,j}^2$ is the variance for pixel (l,j);
$\sigma_{l,j}$ is the square root of variance for pixel (l,j); and Σ is the matrix variance for the image.

The pre-processing module may the instruct the biometric facial recognition computing platform 110 to store the determinations, as well as the images, in, for example, a database 119. The pre-processing of the pre-stored images reduces the time to determine whether a match exists (e.g., when a user is requesting access to a device or attempting to process a transaction). In addition, the pre-processing of nine pixels and storing the associated determinations minimizes the amount of resources needed for storing the determinations. In some examples, the storage needed for image similarity determination may be less than the storage needed for an image. Accordingly, in some examples, the determinations may be stored while the images might not be stored, or may be stored elsewhere to conserve resources.

Biometric facial recognition computing platform 110 may further include a captured image processing module 114. For instance, upon a user requesting access to a device or processing of an event or transaction, such as a self-service device 102 or other device 108, the captured image processing module 114 may instruct (e.g., command or direct, transmit an instruction, or the like) an image capture device 106 to capture an image of the user requesting access. In some examples, the captured image processing module 114 may evaluate a position of a user at the device 102 or 108 to determine whether the position is appropriate to capture an image. For instance, the captured image processing module 114 may determine, in real-time, whether a user is positioned to capture a sufficient image (e.g., whether the user is at an appropriate height, facing a proper direction, or the like). If not, the captured image processing module 114 may transmit a notification to device 102 or 108 instructing the user to modify his or her position.

The captured image processing module 114 may instruct the image capture device 106 to capture an image of the user. In some examples, the image capture device may be a camera associated with, connected to, in communication with, or the like, the self-service device 102 or other device 108. In other arrangements, the image capture device 106 may be a camera that is part of a user computing device 104, such as a smartphone, tablet computing device, cell phone or the like.

Upon capturing the image, the image may be transmitted to the captured image processing module 114 for processing to determine whether the captured image matches a pre-stored (and pre-processed) image associated with the user. In some examples, the captured image processing module 114 may determine whether the image is sufficient for processing. For instance, the captured image processing module 114 may determine whether the user's face is captured in the image, whether a sufficient region of the face is captured, and the like.

In some examples, the captured image processing module 114 may scale the image to be a same or substantially the same size (e.g., same number of pixels) as a pre-stored reference image. For instance, in the example above, the pre-stored image was m×n pixels. Accordingly, the captured image processing module 114 may scale the captured image to be m×n pixels.

Further, in some arrangements, the captured image processing module 114 may determine whether the image is in grayscale and, if not, may convert the image to grayscale.

Similar to the arrangements discussed above, mean pixel value $\tilde{\mu}$ may be calculated for the captured image. For instance, the mean pixel value for a pixel (e.g., pixel p[l,k] of the captured image may be determined using equation 3, similar to equation 1.

$$\tilde{\mu} = \sum_{l=1}^{m}\sum_{k=1}^{n} \frac{g[l,k]}{mXn} \quad \text{Equation 3}$$

The variance of the captured image (e.g., of pixel p[l,k]) may be determined using an equation similar to equation 2. For instance, the variance may be determined using:

$$\text{var}_{l,k} = \tilde{\sigma}_{l,k}^2 = \frac{1}{9}\sum_{a=l-1}^{l+1}\sum_{b=k-1}^{k+1}(g[a,b]-\tilde{\mu})^2 \quad \text{Equation 4}$$

$$\sum = \text{diag}(\text{var}_{1,1}, \ldots, \text{var}_{mXn,mXn})$$

The biometric facial recognition computing platform 110 may further include an authentication module 115. The authentication module may include hardware and/or software configured to perform various functions within the biometric facial recognition computing platform 110. For instance, the authentication module 115 may receive an initial request to provide access to a device, process a transaction, or the like, and, based on identifying information provided by a user (e.g., username, password, data from an automated teller machine or debit card, or the like) may identify one or more pre-stored images of the user to be used for comparison with a captured image for identity verification, providing access to the device, processing events, or the like.

Further, the authentication module 115 may receive data associated with the one or more pre-stored images (e.g., from the pre-processing module 113 or from database 119), as well as data from the processed, captured image (e.g., from the captured image processing module 114) to determine whether the captured images matches (e.g., within a predetermined threshold) the pre-stored image. For instance, a probabilistic neural network (PNN) may be used to determine a similarity score between the captured image and the pre-stored image. For instance, the PNN may be used to determine the similarity score using equation 5.

$$y = \sum_{S} \frac{1}{\sqrt{2\pi|\Sigma|}^{mn}} \times \exp\left(-\frac{(v-\tilde{\mu}-g+\mu)\sum^{-1}(v-\tilde{\mu}-g+\mu)^T}{2}\right) \quad \text{Equation 5}$$

Where:
S is the number of pre-stored images associated with the user;
T is the transpose operator on the vector (v−$\tilde{\mu}$−g+μ);
v is the pixel vector from image being analyzed (e.g., the captured image) and $\tilde{\mu}$ is its mean;
g is the pixel vector from image on file and μ is its mean.
g is the mean of image on file.

Using the covariance matrix calculated during pre-processing, equation 5 may be reduced to equation 6.

$$y = \sum_{S} \frac{1}{\sqrt{2\pi|\Sigma|}^{mn}} \times \quad \text{Equation 6}$$

-continued $$\exp\left(-\frac{1}{2}\sum_{a=1}^{m}\sum_{b=1}^{n}\frac{(v[a,b]-\tilde{\mu}-g[a,b]+\mu)^2}{\sigma_{a,b}^2}\right)$$

In some examples, the authentication module 115 may compare the similarity score (y in equation 6) to a predetermined threshold. For instance, if the similarity score is at or above the threshold, the images may be classified as a match and the user may be authenticated, given access to the device, event may be processed, or the like. If the similarity score is below the threshold, the user may be denied access, provided limited functionality, and/or additional information may be requested.

The biometric facial recognition computing platform 110 may include a function enablement module 116. The function enablement module 116 may include hardware and/or software configured to perform various functions within the biometric facial recognition computing platform 110. For instance, the function enablement module 116 may receive, from the authentication module 115, an indication of whether the images are a match (e.g., have a similarity score at or above the threshold). If so, the function enablement module 116 may command and control a device, such as self-service device 102, other device 108, or the like, to provide access to the user, process a requested event, or the like. That is, the function enablement module 116 may transmit an instruction to the device activating the device or enabling functionality for the user. In some examples, the function enablement module 116 may enable processing of an event (e.g., withdrawal, deposit, request for account balance, check cashing, or the like). Alternatively, if the similarity score is below the threshold, the function enablement module 116 may command and control the self-service device 102 or other device 108 to request additional authenticating information from the user, prevent access to one or more functions of the device, or the like.

As indicated above, device 102 may be a self-service device or kiosk, such as an automated teller machine (ATM), video-assist device, or the like. However, the biometric facial recognition arrangements discussed herein may be used with other types of devices and in other implementations as well. For instance, other device 108 may be a vehicle and an unauthorized use prevention tool may include biometric facial recognition of a driver in order to start or operate the vehicle. Various other devices may implement one or more aspects of the biometric facial recognition arrangements discussed herein without departing from the invention.

Figure 2A:
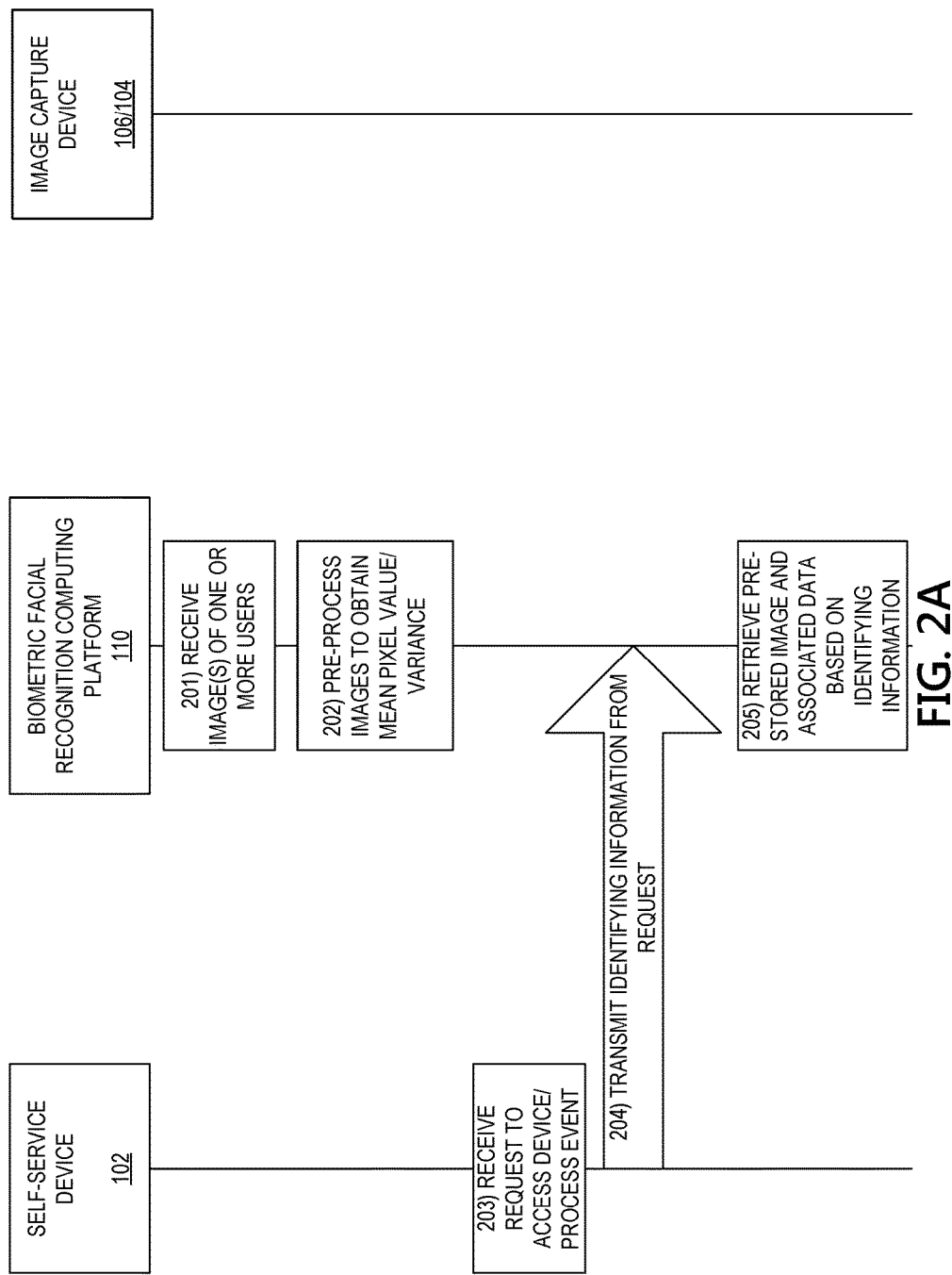
FIGS. 2A-2C depict an illustrative event sequence for performing biometric facial recognition according to one or more aspects described herein.
Figure 2B:
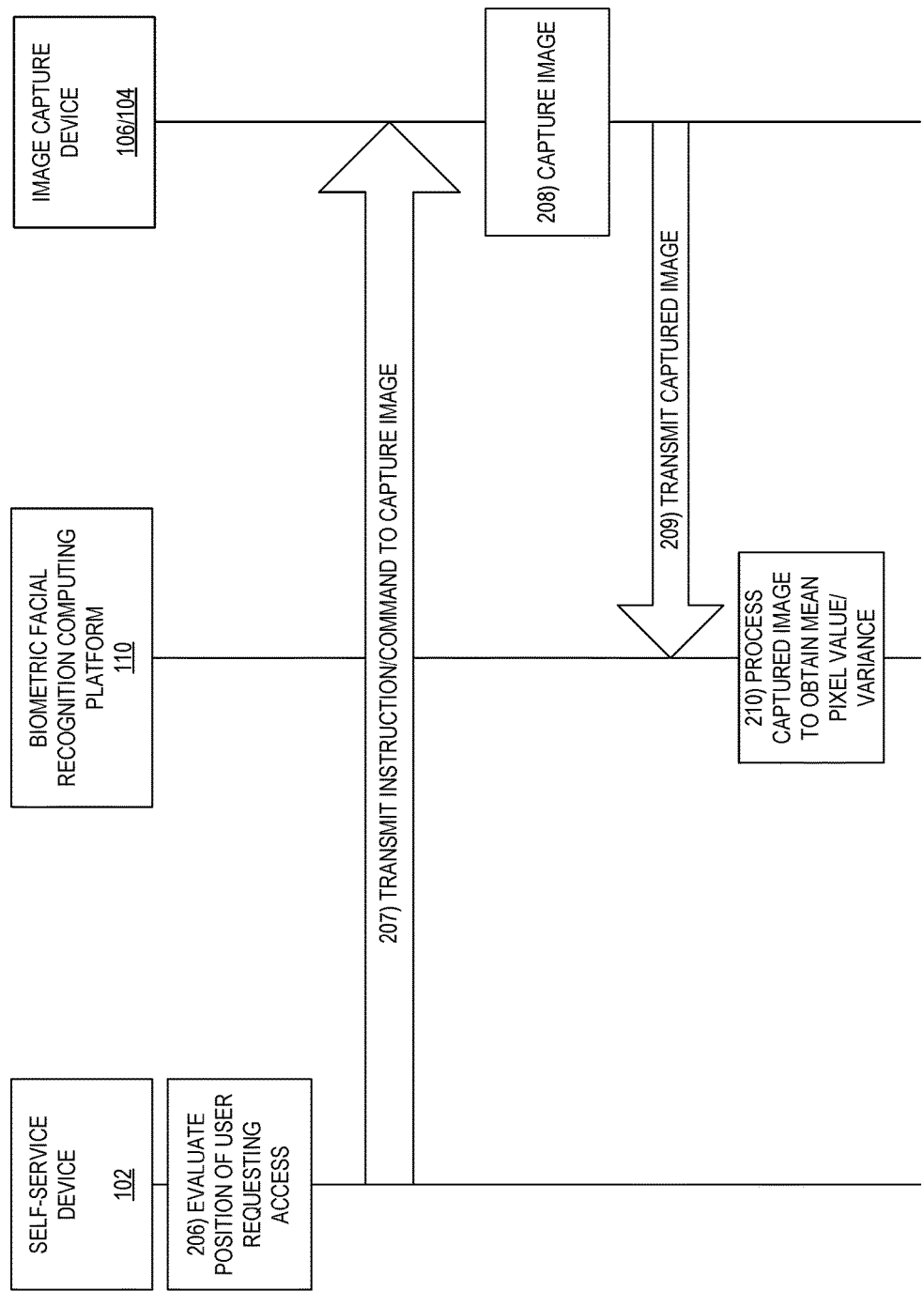
Figure 2C:
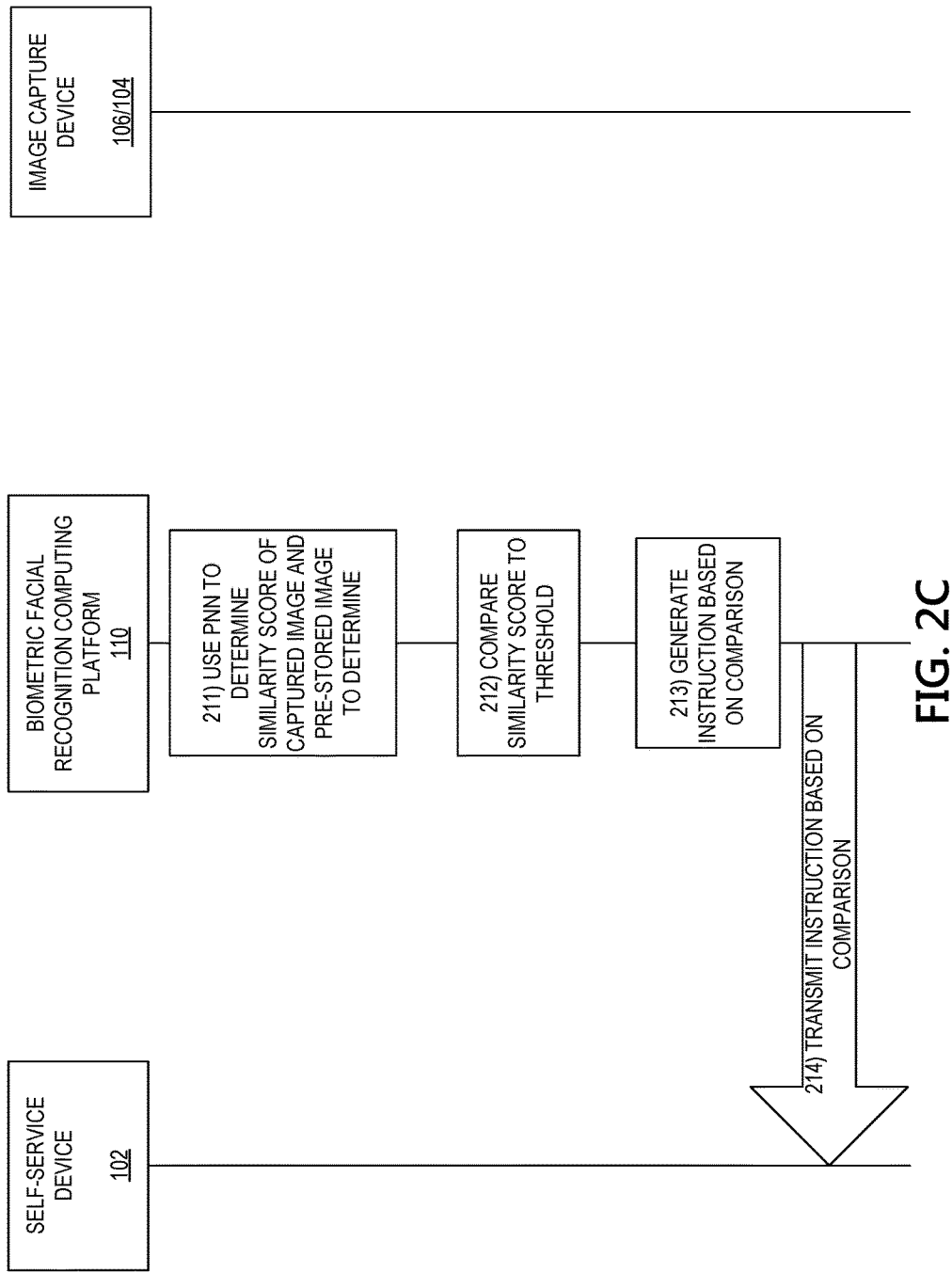

FIGS. 2A-2C illustrate one example event sequence for biometric facial recognition for providing access to a device and/or processing an event in accordance with one or more aspects described herein. The sequence illustrated in FIGS. 2A-2C is merely one example sequence and various other events may be included, or events shown may be omitted, without departing from the invention.

With reference to FIG. 2A, in step 201, one or more images of one or more users may be received by, for instance, the biometric facial recognition computing platform 110. For instance, an entity operating or associated with the biometric facial recognition computing platform 110 may request or capture images of users. In some examples, one or more images of a user may be captured or received when a user becomes a customer of the entity. In another example, an image of a user may be captured or received when the user opens a new account, purchases an additional service or product, or the like. The images may be captured by an image capture device and uploaded or transferred to the biometric facial recognition computing platform 110. In some examples, images may be uploaded from a user device to the biometric facial recognition computing platform 110.

Accordingly, a library of images comprising of one or more images per user may be maintained. In some examples, the images may be stored in a database (such as database 119) and may be associated with a user (e.g., name of a user, unique identifier of a user, username and/or password of a user, ATM or debit card number of a user, personal identification number (PIN) of a user, or the like). Accordingly, the user information associated with the image(s) may be used to retrieve one or more images, as discussed more fully herein.

In step 202, the image(s) of the one or more users (e.g., each image) may be pre-processed to obtain a mean pixel value for the image and associated pixel variance. As discussed above with respect to the equations described, each image may be pre-processed to obtain a mean pixel value and pixel variance. In some examples, as discussed herein, the variance for a pixel may be calculated using its data and data for eight adjacent pixels. Upon completion of pre-processing, the variance (and, in some examples, mean pixel value) may be stored in database 119. In some examples, the pixel variance or other pre-processing data may be stored in association with one or more images of a user and/or user information such that retrieving pre-processed data may be performed by querying the database using one or more types of user information as an input (e.g., name, unique identifier, PIN, ATM card number, or the like).

In step 203, a request to access a device and/or process an event, such as a transaction, may be received at, for instance, a self-service device 102. The self-service device 102 may be an ATM, ATA, video assistance terminal, or the like. In some examples, the request to access the device (or functionality of the device) and/or process an event may be performed by a user inputting a device, such as an ATM card, debit card, or the like, into the device. In other examples, the request may be made by the user inputting user identifying information into the device (e.g., username and password, PIN, or the like).

In step 204, identifying information from the request to access the device and/or process events may be transmitted from the self-service device 102 to the biometric facial recognition computing platform 110. For instance, a device number, such as ATM card number, debit card number, or the like, may be read from the device used to request access and/or event processing. In another example, a username, password and/or PIN may be transmitted to the biometric facial recognition computing platform 110 as identifying information.

In step 205, the identifying information may be used to retrieve one or more images and/or associated data. For instance, the identifying information transmitted in step 204 may be used as input in a database query to retrieve one or more images and/or associated information stored in the database.

With respect to FIG. 2B, in step 206, a position of the user requesting access to the device 102 or event processing may be evaluated. For instance, the self-service device 102 may determine whether the user is facing an image capture device 106 associated with the self-service device 102. In another example, the self-service device 102 may determine whether the user's face is aligned with the image capture device 106. If not the device may transmit an instruction to a user (e.g., may display an instruction on the self-service device) providing instructions to modify his or her position, as will be discussed more fully herein.

In step 207, the self-service device 102 may direct or command the image capture device 106 to capture an image of the user requesting access to the self-service device or event processing. In some examples, the self-service device 102 may transmit an instruction to the image capture device 106 instructing the device to capture the image of the user. In other examples, the self-service device 102 may transmit an instruction to another device, such as a user computing device 104 (e.g., a smartphone, tablet device, or the like) to capture an image of the user. In some examples, global positioning system (GPS) data from the user computing device 104 may be used to confirm a location of the user in the image being captured (e.g., that the GPS location is within a predetermined distance of a known location of the self-service device 102).

In step 208, an image of the user may be captured by the image capture device 106 of the self-service device 102 or the user computing device 104. In step 209, the captured image may be transferred from the image capture device 106 of the self-service device 102 or from the user computing device 104 to the biometric facial recognition computing platform 110. In step 210, the captured image may be processed, using processes similar to those used for pre-processing the pre-stored images, to determine a mean pixel value and pixel variance of the captured image.

With reference to FIG. 2C, in step 211 a probabilistic neural network may be used to determine a similarity score of the pre-stored image(s) retrieved for the user and the captured image. As discussed above, the mean pixel value and pixel variance for the pre-stored image(s) and captured image may be used to determine a similarity score. In some examples, the similarity score may be a number between zero and 1.0. In step 212, the determined similarity score may be compared to a threshold value. The threshold may be determined by the entity operating the biometric facial recognition computing platform 110 and/or may be based on a level of security desired. For instance, in arrangements in which security is of utmost importance, such as a financial transaction, a greater level of confidence in the match may be desired and, accordingly, a higher threshold for a similarity score may be identified. In situations in which security is a concern but not as significant as financial transactions, for instance if facial recognition is being used to permit a user to start a vehicle or operate or access another device 108, the threshold may be lower. Thus, if the similarity score is at or above the threshold, the user may access the device (and associated functionality) and/or may process events. If the similarity score is below the threshold, access to the device may be denied, only limited functionality may be provided and/or additional identifying information may be requested from the user.

In step 213, one or more instructions may be generated based on the comparison. For instance, if the similarity score is at or above the threshold, the biometric facial recognition computing platform 110 may generate a command or instruction to enable and provide full functionality to the requesting user in step 213. The instruction or command may be transmitted to the self-service device in step 214.

In another example, if the similarity score is below the threshold, the biometric facial recognition computing platform may generate an instruction enabling only limited functionality (e.g., a withdrawal of a limited amount, a deposit, or the like). The biometric facial recognition computing platform 110 may then command the self-service device 102 to enable limited functionality in step 214.

In still another example, if the similarity score is below the threshold, the biometric facial recognition computing platform 110 may generate an instruction denying access to the device and may transmit the instruction to the self-service device in step 214.

In yet another example, if the similarity score is below the threshold, the biometric facial recognition computing platform 110 may generate a request for addition identifying or authentication information (e.g., answers to pre-stored security questions, input of a unique identifier or portion thereof, fingerprint verification, or the like) and may transmit an instruction to display the request to the self-service device 102 in step 214.

Figure 3:
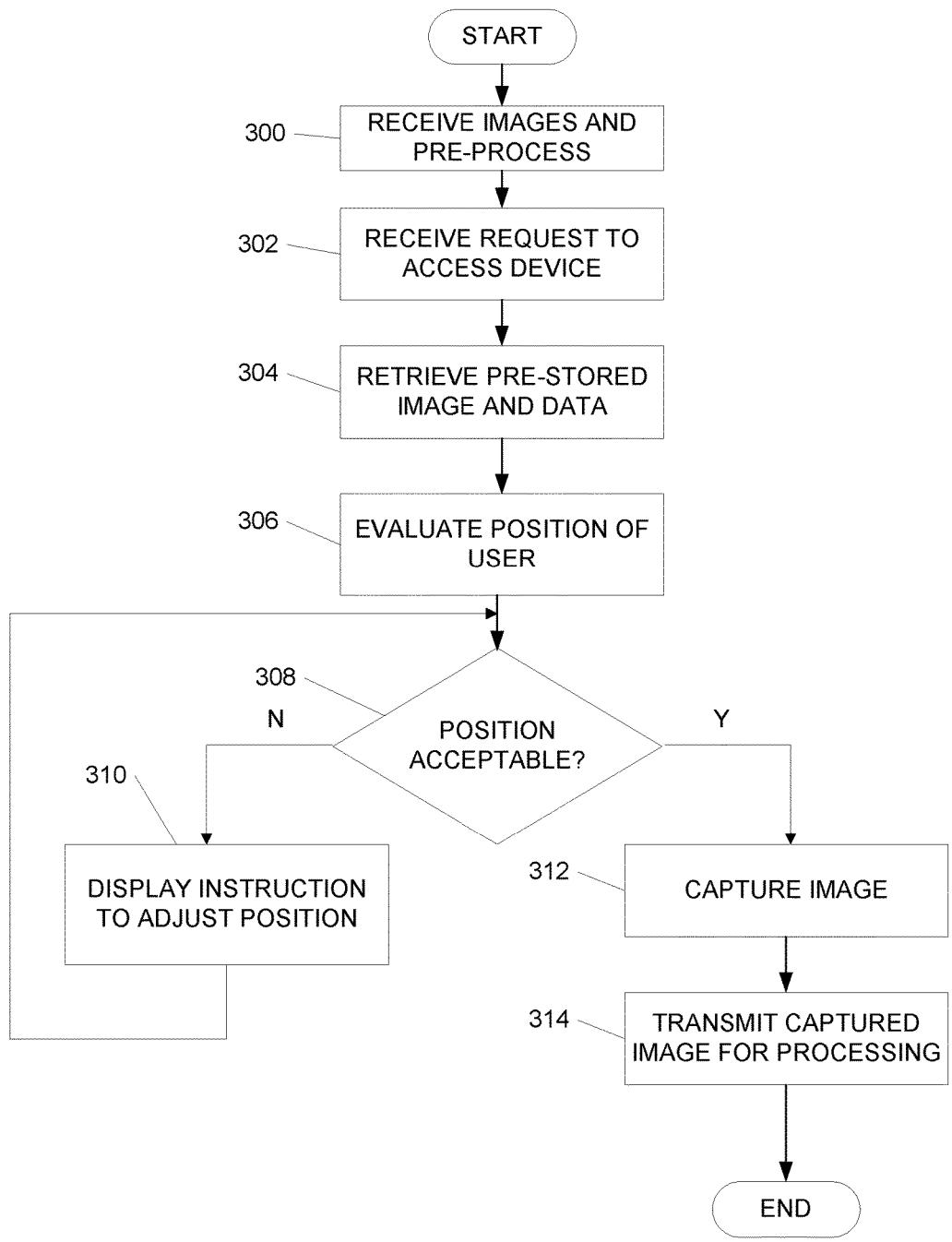
FIG. 3 depicts one example method of receiving images for pre-processing and capturing an image of a user at a device according to one or more aspects described herein

FIG. 3 illustrates one example method of receiving images for pre-processing and capturing an image of a user at a device, such as a self-service device 102, according to one or more aspects described herein. In step 300, one or more images of one or more users may be received. In addition, the received images may be pre-processed, as discussed above, to determine a mean pixel value and pixel variance of each image. The determinations may be associated with the user in the images (e.g., via identifying information of the user) and may be stored for later retrieval and comparison to other, captured images.

In step 302, a request to access a device, such as a self-service device 102 may be received. The request may include identifying information such as a username and password, PIN, account number, debit or ATM card number, name, unique identifier, or the like. In step 304, one or more pre-stored images and/or associated data (e.g., mean pixel value, variance, and the like) may be retrieved using the identifying information from the request as, for instance, input in a database query.

In step 306, a position of a user requesting access to the device may be evaluated. In step 308, a determination may be made as to whether the position of the user is acceptable to capture an image of a face of the user for processing and comparison to the one or more pre-stored images. For instance, the system may determine whether the user's face is visible in a range of the image capture device, whether the user is positioned in front of the image capture device, and the like (reference [1]).

If, in step 308, the position is not acceptable, the system may generate and display instructions to the user for modifying his or her position in step 310. For instance, the system may generate and display an instruction to the user to face the image capture device 106, move left or right, or the like.

If, in step 308, the position is acceptable, the system may capture an image of the user in step 312. In step 314, the captured image may be transmitted (e.g., to the biometric facial recognition computing platform 110) for further processing.

In some examples, the system might not evaluate the position of the user prior to capturing the image. Rather, the system may direct the image capture device to capture an image and the image may be evaluated after being transmitted to, for instance, the biometric facial recognition computing platform 110 to ensure it is acceptable.

Figure 4:
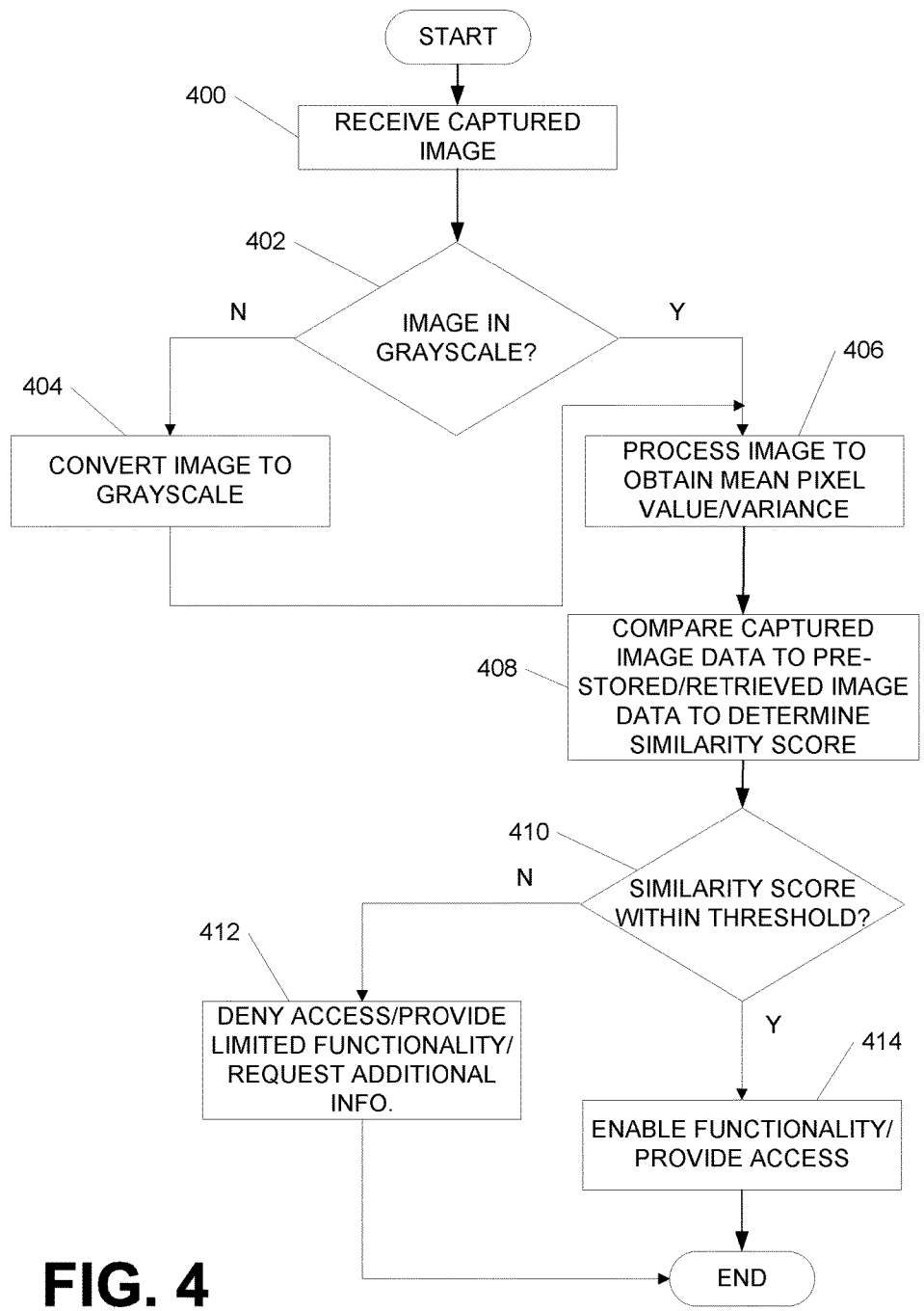
FIG. 4 illustrates one example method of evaluating a captured image to determine whether the image matches one or more pre-stored images, according to one or more aspects described herein.

FIG. 4 illustrates one example method of evaluating a captured image to determine whether the image matches one or more pre-stored images, according to one or more aspects described herein. In step 400, a captured image may be received by the biometric facial recognition computing platform 110. As discussed with respect to FIG. 3, the image may be captured by an image capture device of a self-service device 102 or a user computing device 104.

In step 402, a determination is made as to whether the image is in grayscale. If not, in step 404, the captured image may be converted to grayscale prior to advancing to step 406. If the captured image is in grayscale, or after the captured image has been converted to grayscale, the system may process the captured image to obtain a mean pixel value and pixel variance of the captured image in step 406.

In step 408, the data determined from the captured image may be compared with data from one or more pre-stored images (e.g., images retrieved in step 304 of FIG. 3). For instance, the pixel variance and mean pixel value from the pre-stored image and the captured image may be used to determine a similarity score between the pre-stored image(s) and the captured image. In step 410, the similarity score may be compared to a predetermined threshold and a determination may be made as to whether the similarity score is at or above the threshold. If not, the system may deny the request to access the device or process an event, may provide limited functionality, may request additional identifying or authenticating information, or the like, in step 412.

If, in step 410, the similarity score is at or above the threshold, the system may provide access to the device, enable functionality and/or process events, in step 414.

Figure 5:
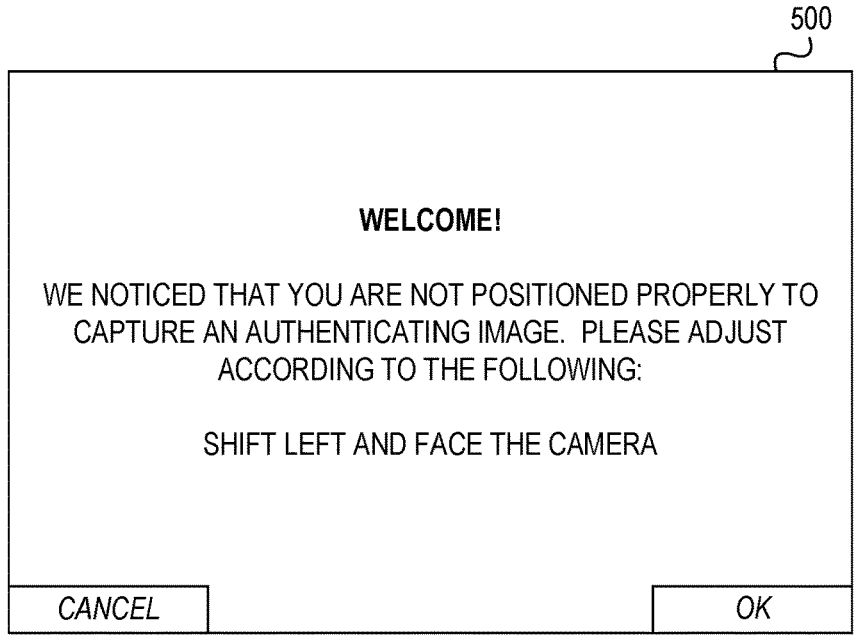
FIG. 5 illustrates another example user interface providing instructions for repositioning a user according to one or more aspects described herein.

FIG. 5 illustrates one example user interface 500 that may be displayed at, for example, a self-service device. The user interface may include an indication that a user is not positioned properly to capture an image of the user and may include one or more instructions for repositioning the user.

Figure 6:
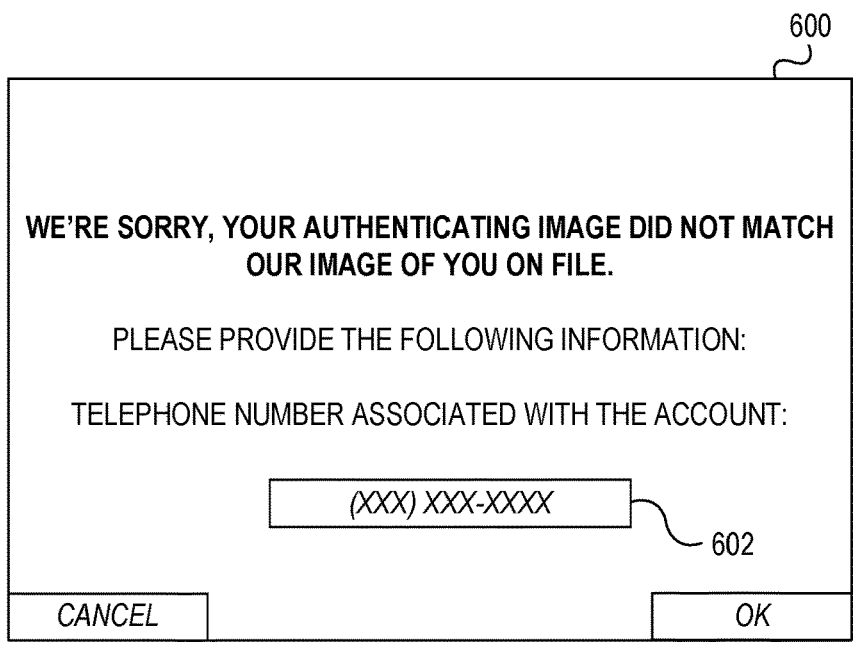
FIG. 6 illustrates one example user interface for requesting additional information if the captured image does not match the pre-stored image, according to one or more aspects described herein.

FIG. 6 illustrates one example user interface 600 notifying a user that the captured image of the user does not match the pre-stored images of the user. In some examples, if the images are not determined to be a match, the system may request additional authenticating information, as shown in FIG. 6. For instance, the system may request additional information such as a telephone number associated with an account. The interface 600 includes a field 602 in which the user may input the requested additional information. If the additional authentication information provided matches pre-stored information, the user may be permitted to access the device, process events, and the like. If the received additional information does not match pre-stored information, the system may deny access to the device or provide access to limited functionality (e.g., some functionality will be disabled by the system).

As discussed herein, the various systems and arrangements described provide fast and efficient processes for confirming an identity of a user, authenticating a user, providing access to a device or functionality of a device, and the like. As discussed herein, the arrangements described provide for enhanced security of events processed at self-service devices, such as ATM's. In addition, the arrangements described herein require minimal additional storage (e.g., storage of mean pixel value and variance for pre-processed images requires minimal storage. For example, the storage for these values may be less than storage required for the one or more pre-stored images.). Further, the arrangements described herein provide for fast, efficient, and reliable biometric facial recognition, which may be significant when using facial recognition to authenticate users at self-service devices, such as ATM's.

Although various aspects described herein are described in the context of using biometric facial recognition to provide access to, for instance, a self-service device, the arrangements discussed herein may be used to authenticate users in various other areas as well without departing from the invention. For instance, vehicles may employ the biometric facial recognition arrangements discussed herein to provide fast facial recognition in order to avoid unauthorized access to a vehicle. For instance, an unauthorized access or use deterrent in a vehicle may involve capturing an image of a user attempting to start or operate the vehicle and determine whether the captured images matches one or more pre-stored images. If so, the vehicle may be enabled to operate. If not, the user might not start, shift into gear, or the like. This may aid in ensuring that only authorized users operate a vehicle.

In other examples, law enforcement agencies may employ the systems and arrangements discussed herein to conduct quick, efficient and reliable facial recognition to identify persons of interest, or the like.

Various other implementations of the arrangements described herein may be used without departing from the invention.

Figure 7:
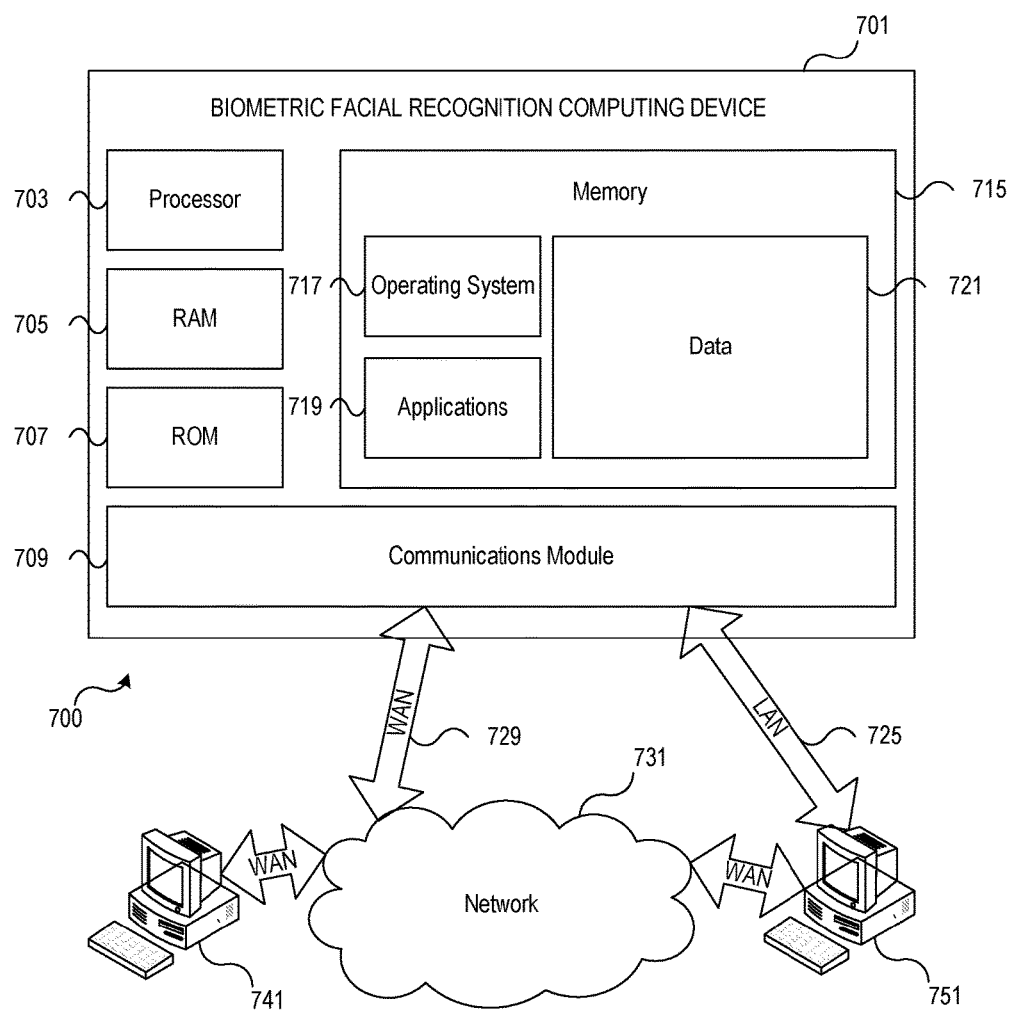
FIG. 7 illustrates one example operating environment in which various aspects of the disclosure may be implemented in accordance with one or more aspects described herein.

FIG. 7 depicts an illustrative operating environment in which various aspects of the present disclosure may be implemented in accordance with one or more example embodiments. Referring to FIG. 7, computing system environment 700 may be used according to one or more illustrative embodiments. Computing system environment 700 is only one example of a suitable computing environment and is not intended to suggest any limitation as to the scope of use or functionality contained in the disclosure. Computing system environment 700 should not be interpreted as having any dependency or requirement relating to any one or combination of components shown in illustrative computing system environment 700.

Computing system environment 700 may include biometric facial recognition computing device 701 having processor 703 for controlling overall operation of biometric facial recognition computing device 701 and its associated components, including random-access memory (RAM) 705, read-only memory (ROM) 707, communications module 709, and memory 715. Biometric facial recognition computing device 701 may include a variety of computer readable media. Computer readable media may be any available media that may be accessed by biometric facial recognition computing device 701, may be non-transitory, and may include volatile and nonvolatile, removable and non-removable media implemented in any method or technology for storage of information such as computer-readable instructions, object code, data structures, program modules, or other data. Examples of computer readable media may include random access memory (RAM), read only memory (ROM), electronically erasable programmable read only memory (EEPROM), flash memory or other memory technology, compact disk read-only memory (CD-ROM), digital versatile disks (DVD) or other optical disk storage, magnetic cassettes, magnetic tape, magnetic disk storage or other magnetic storage devices, or any other medium that can be used to store the desired information and that can be accessed by computing device 701.

Although not required, various aspects described herein may be embodied as a method, a data processing system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed on a processor on biometric facial recognition computing device 701. Such a processor may execute computer-executable instructions stored on a computer-readable medium.

Software may be stored within memory 715 and/or storage to provide instructions to processor 703 for enabling biometric facial recognition computing device 701 to perform various functions. For example, memory 715 may store software used by biometric facial recognition computing device 701, such as operating system 717, application programs 719, and associated database 721. Also, some or all of the computer executable instructions for biometric facial recognition computing device 701 may be embodied in hardware or firmware. Although not shown, RAM 705 may include one or more applications representing the application data stored in RAM 705 while biometric facial recognition computing device 701 is on and corresponding software applications (e.g., software tasks) are running on biometric facial recognition computing device 701.

Communications module 709 may include a microphone, keypad, touch screen, and/or stylus through which a user of biometric facial recognition computing device 701 may provide input, and may also include one or more of a speaker for providing audio output and a video display device for providing textual, audiovisual and/or graphical output. Computing system environment 700 may also include optical scanners (not shown). Exemplary usages include scanning and converting paper documents, e.g., correspondence, receipts, and the like, to digital files.

Biometric facial recognition computing device 701 may operate in a networked environment supporting connections to one or more remote computing devices, such as computing devices 741 and 751. Computing devices 741 and 751 may be personal computing devices or servers that include any or all of the elements described above relative to biometric facial recognition computing device 701.

The network connections depicted in FIG. 7 may include local area network (LAN) 725 and wide area network (WAN) 729, as well as other networks. When used in a LAN networking environment, biometric facial recognition computing device 701 may be connected to LAN 725 through a network interface or adapter in communications module 709. When used in a WAN networking environment, biometric facial recognition computing device 701 may include a modem in communications module 709 or other means for establishing communications over WAN 729, such as network 731 (e.g., public network, private network, Internet, intranet, and the like). The network connections shown are illustrative and other means of establishing a communications link between the computing devices may be used. Various well-known protocols such as transmission control protocol/Internet protocol (TCP/IP), Ethernet, file transfer protocol (FTP), hypertext transfer protocol (HTTP) and the like may be used, and the system can be operated in a client-server configuration to permit a user to retrieve web pages from a web-based server. Any of various conventional web browsers can be used to display and manipulate data on web pages.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like and are configured to perform the functions described herein.

Figure 8:
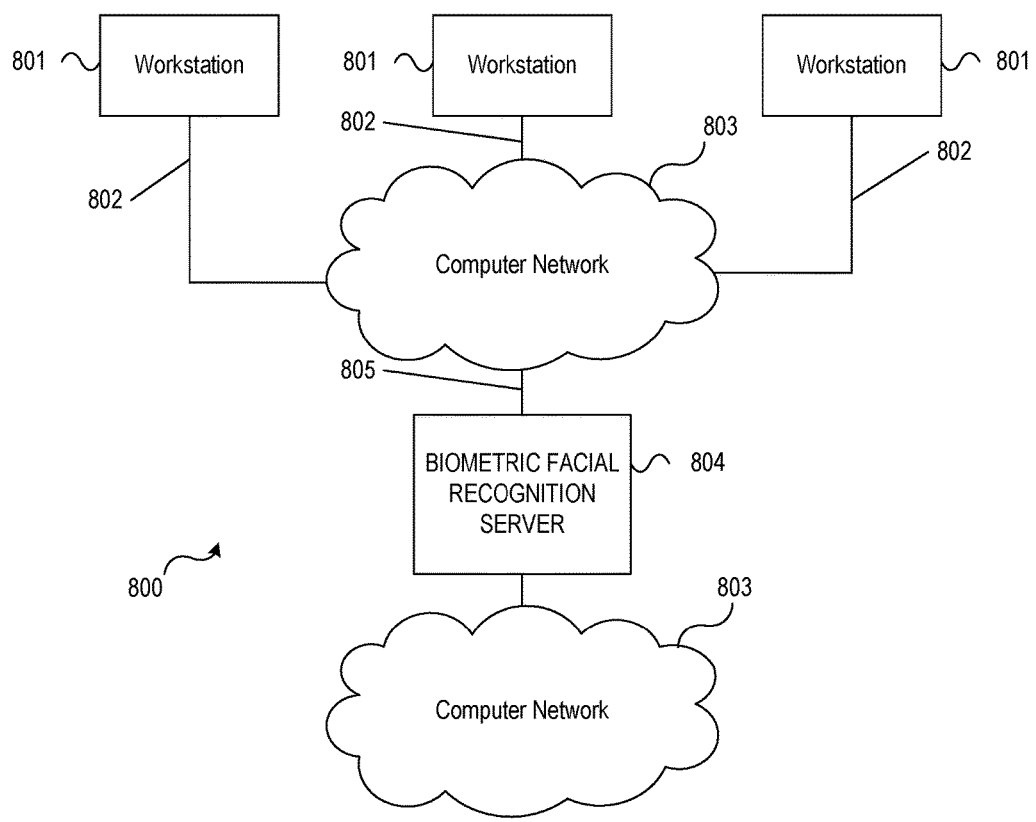
FIG. 8 depicts an illustrative block diagram of workstations and servers that may be used to implement the processes and functions of certain aspects of the present disclosure in accordance with one or more aspects described herein.

FIG. 8 depicts an illustrative block diagram of workstations and servers that may be used to implement the processes and functions of certain aspects of the present disclosure in accordance with one or more example embodiments. Referring to FIG. 8, illustrative system 800 may be used for implementing example embodiments according to the present disclosure. As illustrated, system 800 may include one or more workstation computers 801. Workstation 801 may be, for example, a desktop computer, a smartphone, a wireless device, a tablet computer, a laptop computer, and the like, configured to perform various processes described herein. Workstations 801 may be local or remote, and may be connected by one of communications links 802 to computer network 803 that is linked via communications link 805 to biometric facial recognition server 804. In system 800, biometric facial recognition server 804 may be any suitable server, processor, computer, or data processing device, or combination of the same, configured to perform the functions and/or processes described herein. Server 804 may be used to process the instructions received from one or more devices, integrate requirements, generate identifiers, and the like.

Computer network 803 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 802 and 805 may be any communications links suitable for communicating between workstations 801 and biometric facial recognition server 804, such as network links, dial-up links, wireless links, hard-wired links, as well as network types developed in the future, and the like.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may comprise one or more non-transitory computer-readable media.

As described herein, the various methods and acts may be operative across one or more computing servers or platforms and one or more networks. The functionality may be distributed in any manner, or may be located in a single computing device (e.g., a server, a client computer, and the like), or across multiple computing devices. In such arrangements, any and/or all of the above-discussed communications between modules of the computing platform may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A biometric facial recognition computing platform, comprising:
   at least one processor;
   a communication interface communicatively coupled to the at least one processor; and
   at least one memory storing computer-readable instructions that, when executed by the at least one processor, cause the biometric facial recognition computing platform to:
   receive a request to access a device, the request including user identifying information;
   query a database to obtain a pre-stored image of a user associated with the user identifying information and data associated with the pre-stored image, the data including a mean pixel value of the pre-stored image and a variance of the pre-stored image, the variance being determined based on data from at least a first pixel of the pre-stored image and eight pixels adjacent the first pixel of the pre-stored image;
   capture, via an image capturing device, an image of a user requesting access to the device;
   determine a mean pixel value for the captured image of the user requesting access to the device;
   determine, based on the mean pixel value for the captured image, a variance of the captured image, the variance further being based on data from at least a first pixel of the captured image and eight pixels adjacent the first pixel of the captured image;
   use a probabilistic neural network to determine a similarity score between the pre-stored image and the captured image based, at least in part, on the data associated with the pre-stored image and the mean pixel value and variance for the captured image; and
   determine whether the similarity score is at or above a pre-determined threshold; and
   responsive to determining that the similarity score is at or above the pre-determined threshold, provide access to the device.

2. The biometric facial recognition computing platform of claim 1, wherein providing access to the device includes enabling functionality of the device.

3. The biometric facial recognition computing platform of claim 1, further including instructions that, when executed, cause the biometric facial recognition computing platform to:
   responsive to determining that the similarity score is not above the pre-determined threshold, providing limited access to the device.

4. The biometric facial recognition computing platform of claim 3, wherein providing limited access includes enabling some functionality of the device and disabling other functionality of the device.

5. The biometric facial recognition computing platform of claim 1, further including instructions that, when executed, cause the biometric facial recognition computing platform to:
   responsive to determining that the similarity score is not above the pre-determined threshold, prevent access to the device.

6. The biometric facial recognition computing platform of claim 1, further including instructions that, when executed, cause the biometric facial recognition computing platform to:
   responsive to determining that the similarity score is not above the pre-determined threshold, request additional authentication information from the user requesting access to the device.

7. The biometric facial recognition computing platform of claim 1, wherein the device is a self-service device.

8. The biometric facial recognition computing platform of claim 1, further including instructions that, when executed, cause the biometric facial recognition computing platform to:
   prior to receiving the request to access the device:
     receive one or more images of a user; and
     pre-processing the received one or more images of the user to determine a mean pixel value and variance of each image of the received one or more images.

9. The biometric facial recognition computing platform of claim 1, further including instructions that, when executed, cause the biometric facial recognition computing platform to:
   prior to determining a mean pixel value for the captured image, determine whether the captured image is in grayscale.

10. The biometric facial recognition computing platform of claim 9, further including instructions that, when executed, cause the biometric facial recognition computing platform to:
   responsive to determining that the captured image is not in grayscale, converting the captured image to grayscale and determining the mean pixel value for the captured image; and
   responsive to determining that the captured image is in grayscale, determining the mean pixel value for the captured image.

11. The biometric facial recognition computing platform of claim 1, further including instructions that, when executed, cause the biometric facial recognition computing platform to:

prior to capturing the image of the user requesting access to the device, determine whether a position of the user is appropriate to capture an image; and responsive to determining that the position of the user is not appropriate, displaying an instruction to the user to modify the position of the user.

12. A method, comprising:

receiving, by a device, a request to access the device, the request including user identifying information;

transmitting, by the device, the received request and identifying information to a biometric facial recognition computing platform;

querying, by the biometric facial recognition computing platform, a database to obtain a pre-stored image of a user associated with the user identifying information and data associated with the pre-stored image, the data including a mean pixel value of the pre-stored image and a variance of the pre-stored image, the variance being determined based on data from at least a first pixel of the pre-stored image and eight pixels adjacent the first pixel of the pre-stored image;

capturing, via an image capturing device, an image of a user requesting access to the device;

transmitting, from the image capturing device to the biometric facial recognition computing platform, the captured image;

determining, by the biometric facial recognition computing platform, a mean pixel value for the captured image of the user requesting access to the device;

determining, by the biometric facial recognition computing platform and based on the mean pixel value for the captured image, a variance of the captured image the variance further being based on data from at least a first pixel of the captured image and eight pixels adjacent the first pixel of the captured image;

using a probabilistic neural network to determine, by the biometric facial recognition computing platform, a similarity score between the pre-stored image and the captured image based, at least in part, on the data associated with the pre-stored image and the mean pixel value and variance for the captured image;

determining, by the biometric facial recognition computing platform, whether the similarity score is at or above a pre-determined threshold; and responsive to determining that the similarity score is at or above the pre-determined threshold, providing access to the device.

13. The method of claim 12, wherein providing access to the device includes enabling functionality of the device.

14. The method of claim 12, further including instructions that, when executed, cause the biometric facial recognition computing platform to:

responsive to determining that the similarity score is not above the pre-determined threshold, providing limited access to the device.

15. The method of claim 14, wherein providing limited access includes enabling some functionality of the device and disabling other functionality of the device.

16. The method of claim 12, further including instructions that, when executed, cause the biometric facial recognition computing platform to:

responsive to determining that the similarity score is not above the pre-determined threshold, prevent access to the device.

17. The method of claim 12, further including instructions that, when executed, cause the biometric facial recognition computing platform to:

responsive to determining that the similarity score is not above the pre-determined threshold, request additional authentication information from the user requesting access to the device.

18. The method of claim 12, further including:

prior to receiving the request to access the device:

receive, by the biometric facial recognition computing platform, one or more images of a user; and pre-processing, by the biometric facial recognition computing platform, the received one or more images of the user to determine a mean pixel value and variance of each image of the received one or more images.

19. One or more non-transitory computer-readable media storing instructions that, when executed by a biometric facial recognition computer system comprising at least one processor, memory, and a communication interface, cause the biometric facial recognition computer system to:

receive a request to access a device, the request including user identifying information;

query a database to obtain a pre-stored image of a user associated with the user identifying information and data associated with the pre-stored image, the data including a mean pixel value of the pre-stored image and a variance of the pre-stored image, the variance being determined based on data from at least a first pixel of the pre-stored image and eight pixels adjacent the first pixel of the pre-stored image;

capture, via an image capturing device, an image of a user requesting access to the device;

determine a mean pixel value for the captured image of the user requesting access to the device;

determine, based on the mean pixel value for the captured image, a variance of the captured image, the variance further being based on data from at least a first pixel of the captured image and eight pixels adjacent the first pixel of the captured image;

use a probabilistic neural network to determine a similarity score between the pre-stored image and the captured image based, at least in part, on the data associated with the pre-stored image and the mean pixel value and variance for the captured image;

determine whether the similarity score is at or above a pre-determined threshold; and responsive to determining that the similarity score is at or above the pre-determined threshold, provide access to the device.

20. The one or more non-transitory computer-readable media of claim 19, wherein providing access to the device includes enabling functionality of the device.

21. The one or more non-transitory computer-readable media of claim 19, further including instructions that, when executed, cause the biometric facial recognition computing system to:

responsive to determining that the similarity score is not above the pre-determined threshold, providing limited access to the device.

22. The one or more non-transitory computer-readable media of claim 21, wherein providing limited access includes enabling some functionality of the device and disabling other functionality of the device.

23. The one or more non-transitory computer-readable media of claim 19, further including instructions that, when executed, cause the biometric facial recognition computing system to:
  prior to receiving the request to access the device:
    receive one or more images of a user; and
    pre-processing the received one or more images of the user to determine a mean pixel value and variance of each image of the received one or more images.

24. The one or more non-transitory computer-readable media of claim 19, further including instructions that, when executed, cause the biometric facial recognition computing system to:
  prior to determining a mean pixel value for the captured image, determine whether the captured image is in grayscale.

25. The one or more non-transitory computer-readable media of claim 24, further including instructions that, when executed, cause the biometric facial recognition computing system to:
  responsive to determining that the captured image is not in grayscale, converting the captured image to grayscale and determining the mean pixel value for the captured image; and
  responsive to determining that the captured image is in grayscale, determining the mean pixel value for the captured image.

* * * * *